April 24, 1962     A. J. SABLE     3,031,611
UNIVERSAL TRANSMITTING POTENTIOMETER
Filed Sept. 12, 1957     4 Sheets-Sheet 2

INVENTOR
ARTHUR J. SABLE
by
Mason, Kolehmainen, Rathburn and Wyss
ATTORNEYS.

April 24, 1962 A. J. SABLE 3,031,611
UNIVERSAL TRANSMITTING POTENTIOMETER
Filed Sept. 12, 1957 4 Sheets-Sheet 3
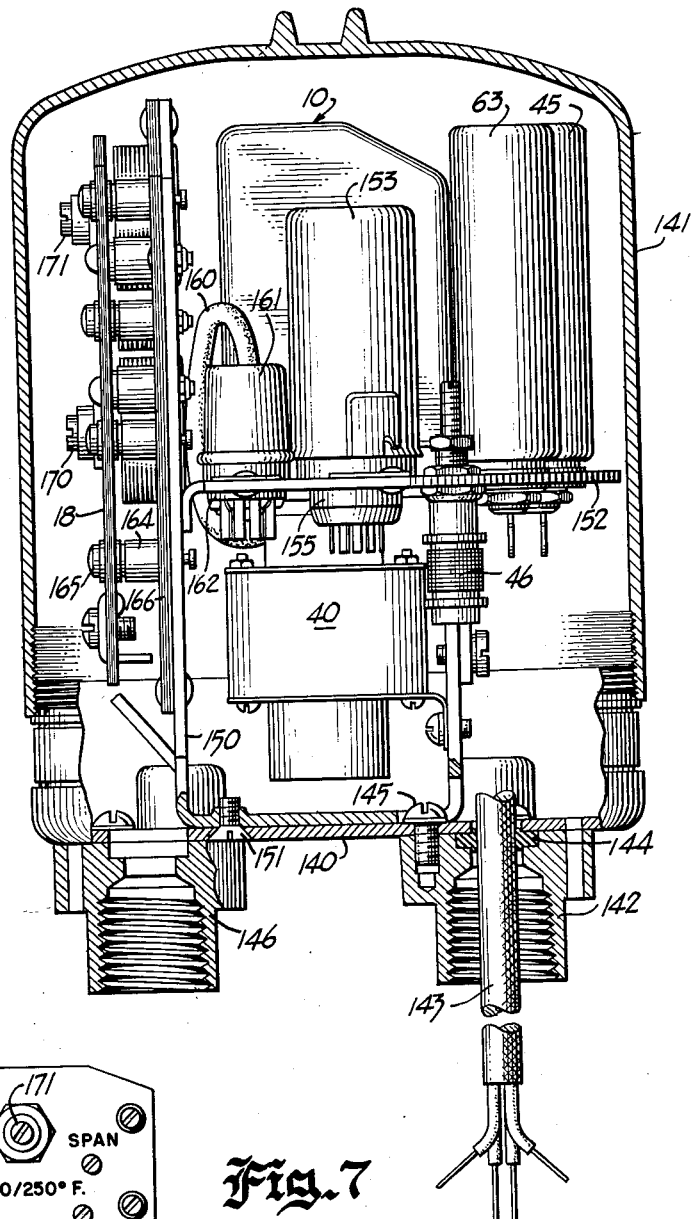
INVENTOR
ARTHUR J. SABLE
by
Mason, Kolehmainen, Rathburn and Wyss
ATTORNEYS.

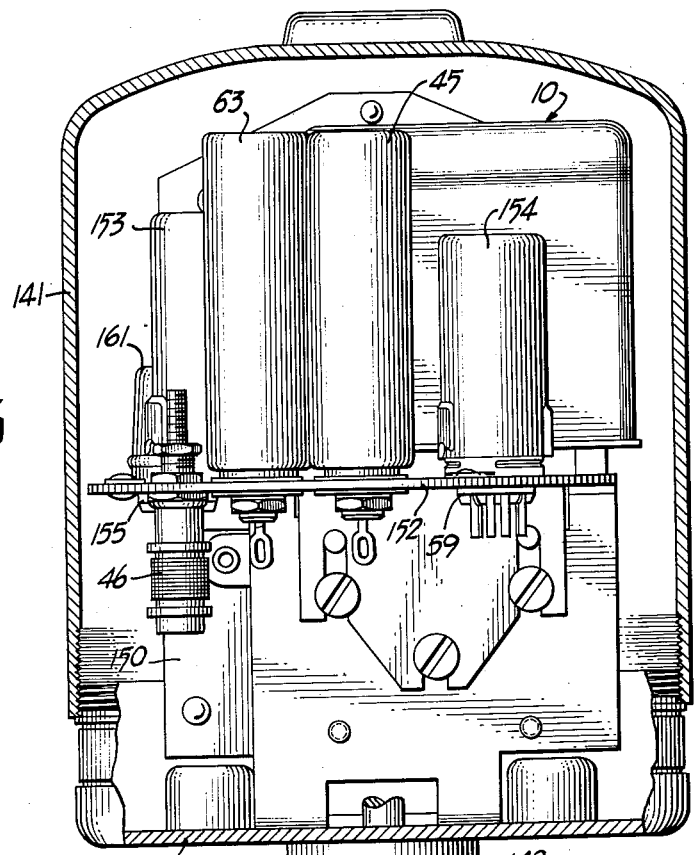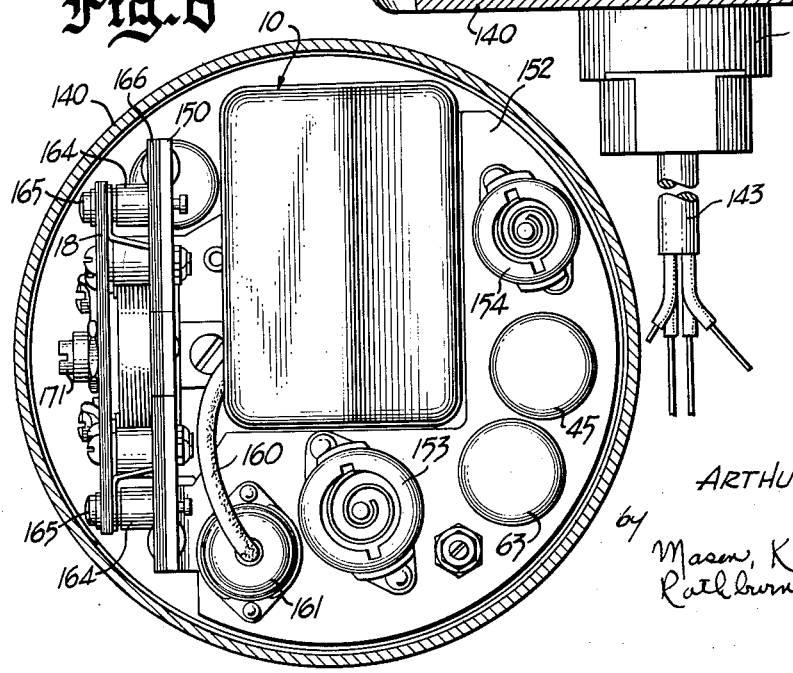

United States Patent Office 3,031,611
Patented Apr. 24, 1962

3,031,611
UNIVERSAL TRANSMITTING POTENTIOMETER
Arthur J. Sable, Milford, Conn., assignor, by mesne assignments, to Robertshaw-Fulton Controls Company, Richmond, Va., a corporation of Delaware
Filed Sept. 12, 1957, Ser. No. 683,511
5 Claims. (Cl. 323—66)

The present invention relates to potentiometer type measuring instruments, and, more particularly, to a sensitive measuring instrument which operates on a continuous null-balance principle to convert a millivolt level direct current signal into a proportional high level direct current output signal suitable for transmission to a remote point. Specifically, the present invention is directed to such a transmitting potentiometer which is of universal application and may be quickly and conveniently adapted to measure thermocouple output signals, resistance bulb thermometer output signals, strain gauge output signals and other low level direct currents and voltages by employing plug-in voltage regulating assemblies of different degrees of regulation corresponding to the permissible accuracy and current requirements of the particular measurement together with readily replaceable range units which include all the necessary circuit components to convert the instrument to a desired span or range.

While many potentiometer type measuring instruments have been developed, these arrangements have suffered from one or more disadvantages which have rendered them unsatisfactory for their intended purpose. Thus, many of these arrangements require the use of a standard cell to provide a standard reference voltage which may be connected in opposition to or compared with the unknown voltage, by using a galvanometer type measuring instrument, and exactly balanced by a voltage supplied by a separate electric circuit which is usually energized from a battery source. In many instances a slide wire potentiometer is employed to obtain such balance and difficulties arise due to improper contact of the sliding contacts on the potentiometer. Furthermore, these contacts must be cleaned periodically and the instrument calibrated and checked with the standard cell, etc. In order to minimize voltage drifts due to temperature effects and the like, some arrangements have employed voltage choppers to convert the direct current signal into an alternating current signal which may be amplified without the voltage drifts normally experienced in direct current amplifiers. However, such voltage choppers either involve mechanically moving parts or require additional circuitry to accomplish the conversion from direct current to alternating current.

In the copending application of Charles G. Roper, Edgar S. Gilchrist and Arthur J. Sable, Serial No. 579,194, filed April 19, 1956, now Patent No. 2,898,545 which application is assigned to the same assignee as the present invention, there is disclosed a transmitting potentiometer wherein standard cells, slide wire potentiometers and voltage choppers are eliminated while providing a proportional high level direct current transmission signal in a simple and reliable manner. While the transmitting potentiometer disclosed in this copending application is entirely satisfactory for its intended purpose, it does require two electromechanical force balance units, one of which is required to provide a standardized or regulated voltage source for the error detecting portion of the transmitting potentiometer. It would be desirable, therefore, to eliminate the electromechanical force balance unit employed for voltage standardization while providing a voltage standard of suitable regulation for a particular type of measurement. However, the voltage and current requirement for different types of measurements are considerably different and require different degrees of regulation. Thus, for resistance bulb measurement a voltage of approximately 85 volts which is regulated to approximately one-half percent is required, the resistance bulb drawing approximately four milliamperes from this voltage source. For thermocouple measurements a voltage of approximately 5 volts which is regulated to one-tenth percent is required, the zero suppression and cold junction compensation circuit of the thermocouple requiring approximately one-half milliampere from this voltage source. This higher accuracy is required because the suppression voltage may be up to five times the span while in resistance bulb application suppression is obtained by resistors in a bridge arrangement. For strain gauge measurements, a well regulated voltage source of approximately 12 volts is required and a relatively high current of 100 milliamperes is required for the strain gauge unit. It will thus be evident that different currents, voltage and regulation requirements are encountered for the above types of measurements.

It is, therefore, an object of the present invention to provide a new and improved transmitting potentiometer which is of universal application and may be readily adapted for measuring a wide variety of low level input signals.

It is another object of the present invention to provide a new and improved measuring instrument of the potentiometer type which is capable of converting a low level direct current signal into a proportional high level direct current output transmission signal and wherein standard voltage sources of different current, voltage and regulation requirements may be selectively plugged into the instrument to accommodate different types of measurements.

The invention, both as to its organization and method of operation, together with further objects and advantages thereof, will best be understood by reference to the following specification taken in connection with the accompanying drawings, in which:

FIG. 4 is a front elevational view of a transmitting potentiometer constructed in accordance with the circuit arrangement of FIG. 1 and enclosed in a weatherproof housing;

FIG. 5 is a right side elevational view of the unit of the transmitting potentiometer of FIG. 4;

FIG. 6 is a top view of the unit of FIG. 4 with the cover of the housing removed; and FIG. 7 is a side elevational view of one of the range adapter units employed in the transmitting potentiometer of FIG. 4.

Figure 1:
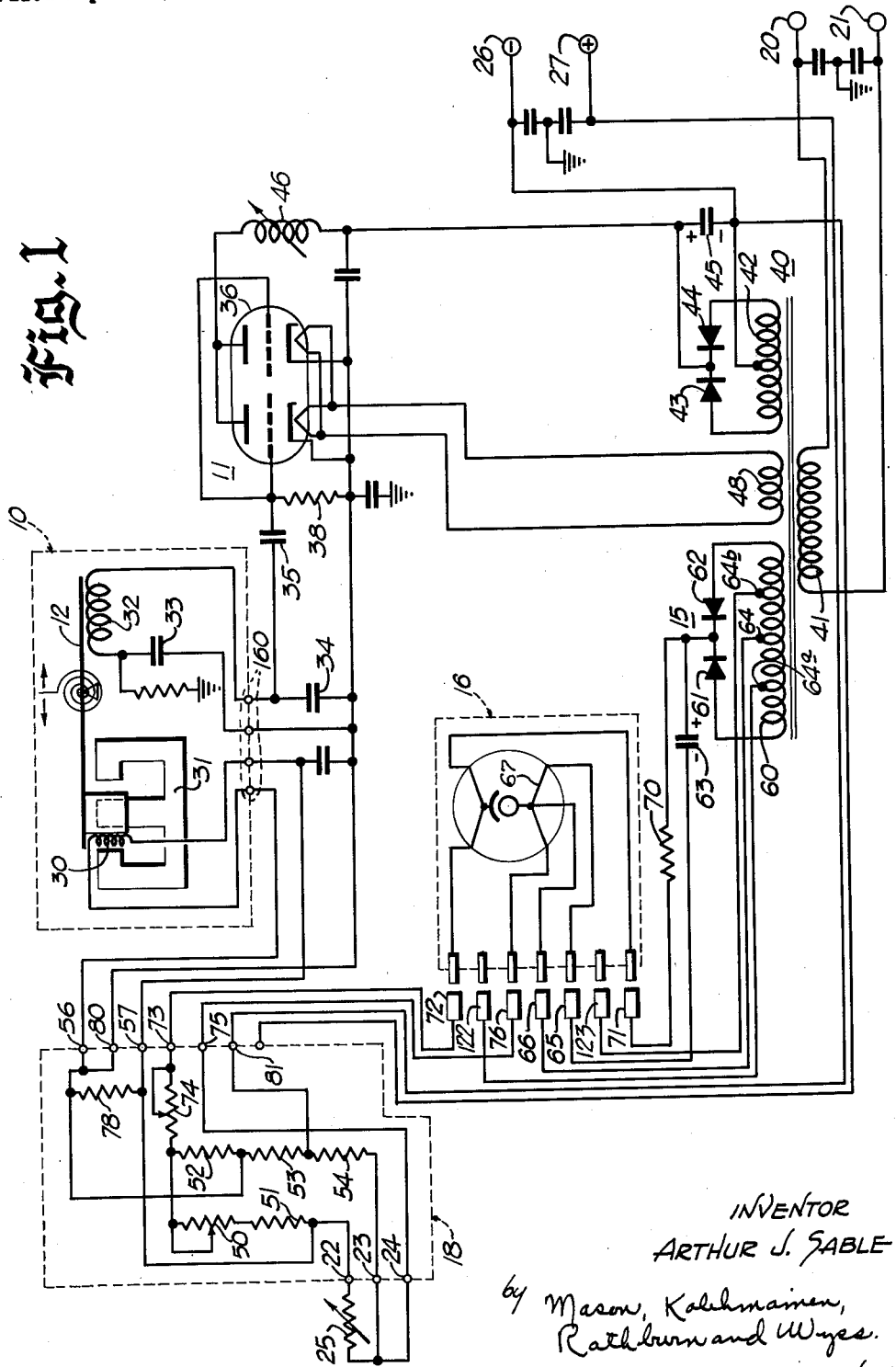
FIG. 1 is a schematic diagram of a transmitting potentiometer embodying the features of the present invention wherein facilities are provided for resistance bulb measurements.

Referring now to the drawings, and more particularly to FIG. 1 thereof, the transmitting potentiometer of the present invention is therein illustrated as comprising an electromechanical force balance unit indicated generally at 10, a tuned oscillator indicated generally at 11, which is controlled by the position of the pivoted beam 12 of the electromechanical balance unit 10, a voltage reference source which, in the embodiment of FIG. 1, comprises a full wave rectifier power supply indicated generally at 15 and a voltage regulator tube 16, and a range adapter unit indicated generally at 18 in FIG. 1.

All of the units 10 to 18, inclusive, are enclosed in a suitable weatherproof housing, as will be described in more detail hereinafter, so that a self-contained transmitter unit is provided to which 110 volt alternating current power is supplied to the input terminals 20 and 21 of the transmitting potentiometer. The transmitting potentiometer is also provided with the input terminals 22, 23 and 24 and in the embodiment of FIG. 1 a resistance bulb thermometer 25 is shown connected to the input terminals 22 and 23, the transmitting potentiometer functioning in a manner to be described in more detail hereinafter to provide a high level direct current output transmission signal at the output terminals 26 and 27 which varies from 1.0 to 5.0 milliamperes over the desired range of resistance bulb measurement.

Considering first the electromechanical force balance unit 10, it is pointed out that the low level electrical signal produced by the resistance bulb thermometer 25 and the associated range adapter unit 18, is supplied to an input coil 30 which is mounted on the beam 12 and is positioned within a magnetic field set up within an annular air gap in the magnetic structure indicated generally at 31 so that an input torque is exerted on the beam 12 proportional to the low level electrical input signal. Adjacent one end of the beam there is provided an oscillator tuning coil 32, the inductance of which varies in accordance with the position of the adjacent portion of the beam 12. The coil 32 is connected in series with the condensers 33 and 34 to provide an oscillator tank circuit, the voltage developed across the condenser 34 being coupled through the condenser 35 to the control grids of the two triode sections of a double triode tube 36, preferably of the commercial type 12AT7, a grid leak resistor 38 being connected between the control grids of the two sections of the tube 36 and the cathode thereof.

In order to provide a unidirectional supply voltage for the oscillator tube 36, there is provided a power transformer 40 having a primary winding 41 which is connected to the alternating current input terminals 20 and 21 and a first secondary winding 42 which cooperates with the selenium rectifiers 43 and 44 and the filter condenser 45 to provide a full wave rectified voltage across the condenser 45 of the polarity indicated in FIG. 1. The positive unidirectional voltage thus directed across the condenser 45 is coupled through the plate tuning coil 46 to the anodes of the two sections of the tube 36, the coil 46 being tunable, by any suitable means such as a powdered iron slug, to permit adjustment of the oscillator frequency for calibration and alignment purposes. A filament winding 48 on the transformer 40 is arranged to supply filament power to the two sections of the tube 36.

Considering now the circuit arrangement of the range adapter unit 18, the resistance bulb thermometer 25 is connected in a bridge circuit the second arm of which comprises a zero adjustment potentiometer 50 and a resistor 51. The third arm of this bridge circuit comprises the resistor 52 and the fourth arm of the bridge circuit comprises a span determining resistor 53 and a zero suppression resistor 54. The input coil 30 of the balance unit 10 is connected by way of the terminals 56 and 57 of the range adapter unit 18 to the midpoint of the above described bridge circuit so that any unbalance of this bridge circuit is supplied to the input coil 30 and produces a corresponding input torque on the beam 12.

The resistance values of the above described bridge circuit are such that a regulated unidirectional voltage source of approximately 85 volts and having the capacity of four milliamperes is required for conventional ranges of resistance bulb thermometers. Furthermore, this regulated voltage source must vary only approximately one-half percent in response to a five percent change in the line voltage applied to the terminals 20, 21 to meet conventional standards of accuracy of the transmitting potentiometer. To meet these requirements the power supply 15 and voltage regulator 16 are provided. More particularly, the power transformer 40 is provided with a second secondary winding 60 the outer ends of which are connected to the selenium rectifiers 61 and 62 to provide a full wave rectified voltage across the filter condenser 63 of the polarity indicated in FIG. 1, the condenser 63 being connected to the center tap 64 of the windings 60 through the terminals 65 and 66 of the tube socket for the tube 16, these terminals being connected together by means of the connection 67 within the tube envelope when the tube 16 is plugged into a socket. A voltage dropping resistor 70 is connected to the tube socket receptacle 71 so that when the tube 16 is plugged into the socket the resistor 70 is connected to the anode of the voltage regulator tube 16 and also to the tube socket receptacle 72. Accordingly, the regulated voltage developed across the tube 16 is connected by way of the range unit terminal 73 and a span adjustment potentiometer 74 to the resistance bulb bridge circuit to provide a regulated voltage therefor, the return circuit for this bridge circuit including the range unit terminal 75 which is connected by way of the tube socket receptacle 76 and the internal connection within the envelope of the tube 16 to the low voltage side of the condenser 63.

In order to provide damping for the beam 12, there is provided a damping resistor 78 which is connected between the terminals 56 and 57 of the range unit 18 and hence across the input coil 30 of the electromechanical force balance unit 10. By including the damping resistor 78 on the range unit 18, various degrees of damping may be provided which are suitable for different applications. Thus, when slow action is required in situations wherein high frequency noise may be present, as for example, when thermocouple measurements are to be made and an average value of thermocouple variation is desired, the value of the resistor 78 may be so chosen as to provide the desired degree of damping and the damping may be changed by merely providing a damping resistor of different value on another range unit.

Considering now the operation of the above described transmitting potentiometer of FIG. 1, it will be understood that as the resistance of the resistance bulb thermometer 25 varies, the above described bridge circuit is unbalanced to provide an error signal which is supplied to the input coil 30 on the beam 12. As the position of the beam 12 varies the tuning of the oscillator 11 is correspondingly varied and the D.C. components of current flow in the tube 36 is supplied by way of the range unit terminal 80, the span resistor 53, the range unit terminal 81 and the load circuit connected to the output terminals 26, 27 by any suitable transmission line, to the negative terminal of the oscillator power supply. The flow of output current through the span resistor 53 produces a voltage across this resistor which is an opposing arm of the bridge circuit from the resistance bulb thermometer 25 and hence functions to rebalance the bridge circuit at the new value of resistance of the bulb 25. The voltage regulator tube 16 functions to maintain the voltage supplied to the bridge circuit within an accuracy of approximately one-half percent under variations in voltage supplied to the terminals 20, 21 of five percent so that the transmitting potentiometer of FIG. 1 has an accuracy of better than one-half percent while being energized by unregulated power plant alternating current.

Figure 2:
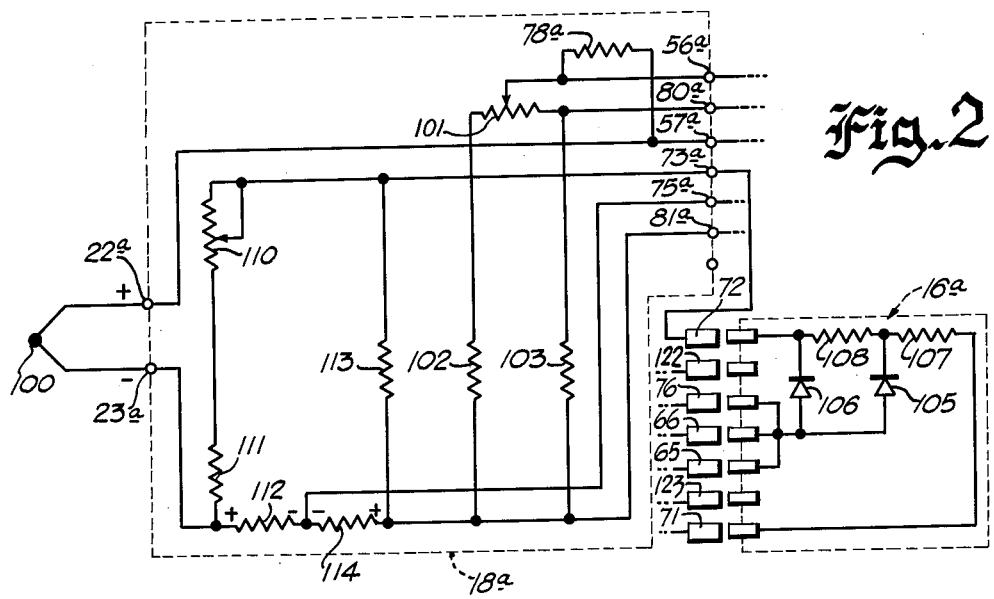
FIG. 2 is a schematic diagram of a range adapter unit which may be employed in the transmitting potentiometer of FIG. 1 for thermocouple measurements.

When it is desired to make thermocouple measurements instead of the above described resistance bulb measurements, the transmitting potentiometer of FIG. 1 may be readily and quickly modified for thermocouple measurements by merely substituting the range adapter unit 18a of FIG. 2 for the range adapter unit of FIG. 1 and removing the voltage regulator tube 16 and substituting therefor the plug-in voltage regulating unit indicated generally at 16a in FIG. 2. On the range adapting unit 18a, the damping resistor 78a is connected between the terminals 56a and 57a so that the input coil 30 is connected between one side of the thermocouple 100 and the arm of a span adjustment potentiometer 101, the right hand end of the potentiometer 101 being connected to the range terminal 20a and the left hand end of the potentiometer being connected through the resistor 102 to the range unit terminal 81a. A resistor 103 is connected between the range terminals 80a and 81a and the output current of the transmitting potentiometer flows through the potentiometer 101 and resistors 102 and 103 to provide a feedback voltage which balances the voltage developed by the thermocouple 100, as explained in more detail in the above identified copending application Serial No. 579,194. In order to provide cold junction compensation the resistor 112 is provided and in order to provide range suppression the resistor 114 is provided, the resistors 112 and 114 being connected in series with the negative terminal 23 of the range unit 18a to the range unti terminal 81a.

In order to provide cold junction compensation and range suppression for thermocouple measurements, it is necessary to provide an extremely well regulated unidirectional voltage which will not be susceptible to any variations in the line voltage supplied to the transmitting potentiometer. In many applications this regulation must be substantially better than that required with resistance bulb thermometer 25 of FIG. 1. Thus, for thermocouple measurements wherein the ratio of span to initial voltage is as high as 5 to 1, in order to have one-half percent span accuracy an accuracy of one-tenth percent is required for the voltage reference source. In order to provide such voltage reference source while permitting the instrument to be readily adapted to either resistance bulb or thermocouple measurements, there is provided a plug-in unit 16a which may be inserted into the tube socket in place of the regulating tube 16 of FIG. 1. The plug-in unit 16a includes a pair of silicon junction diodes 105 and 106 and a pair of series dropping resistors 107 and 108, all of which components are enclosed in an hermetically sealed unit which is provided with a standard seven-pin tube base through which the components 105 to 108, inclusive, are connected in the manner shown in FIG. 2 so as to provide a plug-in unit which is physically interchangeable with the voltage regulator tube 16. When the unit 16a is plugged into the tube socket 59 the resistor 70 is connected in series with the resistor 107 to the cathode of the diode 105 and the anode of the diode 105 is connected to the negative side of the condenser 63 and the center tap 64 of the transformer winding 60. The diode 105 is operated in the Zener breakdown region so that an extremely well regulated voltage is developed across the diode 105, this voltage having a value of approximately 20 volts, the remainder of the voltage developed across the condenser 63 appearing across the series dropping resistors 70 and 107. A second stage of regulation is provided by the series resistor 108 and the reverse connected diode 106 which is also operated in the Zener voltage breakdown region so that a highly regulated unidirectional voltage of approximately 6 volts is developed across the diode 106 and is connected by way of the tube socket terminals 72 and 76 to the range adapter unit terminals 73a and 75a. In the unit 18a the positive voltage applied to the terminal 73a is connected by way of a zero adjustment potentiometer 110 and a series resistor 111 to a cold junction compensation resistor 112. The positive voltage at the terminal 73a also is applied through a resistor 113 to a range suppression resistor 114, the current flow through the resistor 114 being in the opposite direction from current flow through the cold junction compensation resistor 112. The resistors 112 and 114 are connected in series with the thermocouple 100, the input coil of the error detector balance unit 10, and the span network which includes the potentiometer 101 and resistor 102 in parallel with the span resistor 103.

Considering the operation of the transmitting potentiometer, when the range unit 18a and plug-in voltage regulating unit 16a of FIG. 2 are included therein, the input voltage signal developed by the thermocouple 100 must first equal the algebraic sum of the compensation voltage developed across the resistor 112 and the range suppression voltage developed across the resistor 114 to produce an input current through the error detector coil 30. However, the span resistor network is also connected in the output of the oscillator 11 so that a feedback current proportional to the output current flows through the span network in the opposite direction from current flow produced therethrough by the thermocouple input signal. Accordingly, the net voltage applied to the input coil 30 is the difference between the thermocouple voltage and the output voltage developed across the span resistor network and a change in this differential voltage, such as produced by a change in the thermocouple temperature is amplified by the force balance unit 10 and the oscillator 11 so as to produce a change in output current supplied to the output terminals 26, 27. Since the voltage from the regulating unit 16a remains substantially constant, variation in the resistance of the resistor 112 with temperature will provide a variable voltage across this resistor which variation is made equal and opposite to the voltage change at the cold junction of the thermocouple 100.

Figure 3:
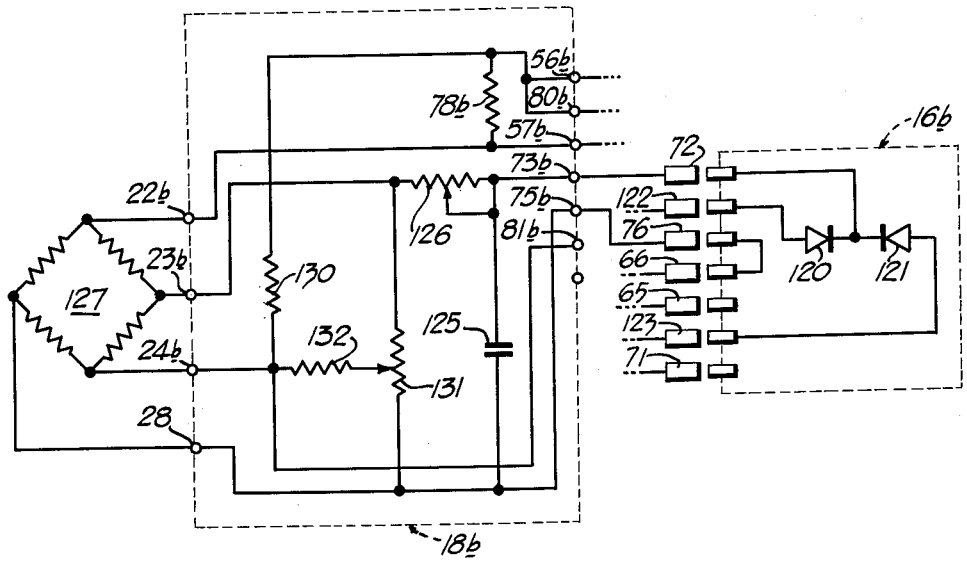
FIG. 3 is a schematic diagram of an alternative range adapter unit which may be employed in the transmitting potentiometer of FIG. 1 for strain gauge measurements.

When strain gauge measurements are to be made, a still different set of voltage, current and regulation conditions are required. Thus, for strain gauge measurements, a low unidirectional voltage of approximately 12 volts and a current drain of up to 100 milliamperes is required with a regulation of approximately one-half percent. Accordingly, when strain gauge measurements are required, the range adapter unit 18 of FIG. 1 is replaced by the range adapter unit 18b of FIG. 3 and the voltage regulator tube 16 is replaced by a plug-in voltage rectifying unit indicated generally at 16b in FIG. 3. The unit 16b includes a pair of germanium rectifiers 120 and 121 which are enclosed in an hermetically sealed unit which is provided with a standard seven-pin tube spacing so that the unit 16b may be plugged into the tube socket 59 in place of the voltage regulating tube 16. When the unit 16b is plugged into the socket 59 the rectifiers 61 and 62, the resistor 70 and the condenser 63 are removed from the A.C. voltage circuit, the center tap 64 of the transformer is connected to the range unit terminal 75b and a relatively small alternating current voltage between taps 64a and 64b of the transformer winding 60 is supplied to the rectifiers 120 and 121 of the plug-in unit 16b by way of the tube socket receptacles 122 and 123 of the tube socket 59. The common anode connection of the rectifiers 120 and 121 is connected by way of the tube socket receptacle 72 to the range unit terminal 73b and in the unit 18b a filter condenser 125 is connected between the terminals 73b and 75b to provide a full wave rectified unidirectional voltage from the output of the rectifiers 120 and 121. A span adjustment potentiometer 126 is connected from the range unit terminal 73b to the input terminal 23 so that the energizing voltage provided for the strain gauge bridge arrangement indicated generally at 127 may be varied by adjustment of the potentiometer 126. A damping resistor 78b is connected between the range unit terminals 56b and 57b to provide the desired amount of damping for the input coil 30 for strain gauge measurements and the D.C. components of the oscillator current is connected by way of the terminal 80b through the span resistor 130, the range unit terminal 81b and the output terminals 26, 27 to the negative side of the oscillator power supply. A zero adjustment potentiometer 131 is connected across the energizing terminal 23, 28 of the strain gauge 127 and a resistor 132 is connected from the arm of the potentiometer 131 to one of the measuring terminals 24 of the strain gauge bridge 127. When the voltage rectifying unit 16b of FIG. 3 is employed, a regulated alternating current is supplied to the input line terminals 20, 21, this alternating voltage being regulated to approximately one-half percent by any suitable means such as a saturating transformer, or the like. It will thus be evident that when the units 16b and 18b are employed the voltage reference source is converted to a low voltage high current arrangement by merely substituting the plug-in unit 16b for one of the plug-in units 16 or 16a so that the transmitting potentiometer may be quickly converted for strain gauge measurements.

The transmitting potentiometer of FIG. 1 is, in accordance with a further feature of the invention, arranged to be contained within a sealed housing shown in FIG. 4 which comprises a base member 140 and a threaded cover member 141. The base member 140 is provided with a first bushing arrangement 142 which is adapted to receive a four-conductor cable 143 containing the conductors which are connected to the terminals 20, 21, 26 and 27 of the transmitting potentiometer of FIG. 1, the cable 143 being sealed by means of the rubber gasket 144 when the bushing 142 is connected to the base member 140 by means of the screws 145. A second bushing 146 is connected to the base member 140 and is adapted to receive the input conductors from the primary measuring element such as the resistance bulb 25, the thermocouple 100, or the strain gauge 127, these input conductors being connected to the appropriate ones of the input terminals 22, 23 and 24 of the range adapter unit 18.

In order to support the electrical components of the transmitting potentiometer, there is provided a U-shaped mounting bracket 150 which is secured to the base member 140 by means of the screws 151 and supports a horizontal chassis 152 on which are mounted the tube socket 155 for the oscillator tube 36, the condenser 63 and 45, and the tube socket 59 which is adapted selectively to receive any one of the plug-in voltage units 16, 16a or 16b. A tube shield 153 is provided for the oscillator tube 36 and the voltage units 16, 16a and 16b are each of such dimensions that a conventional tube shield 154 can be connected to the tube socket 59 to shield the circuit components of the voltage generating units 16, 16a or 16b and retain the same in position on the tube socket 59. The bracket 152 also supports the electromechanical balance unit 10, the output conductors of which are connected by way of the cable 160 to the plug and socket assembly 161, 162 also supported on the bracket 152, it being understood that the receptacles of the socket 162 are connected in circuit as shown in FIG. 1. The power transformer 40 is also supported from the U-shaped bracket 150 and the oscillator tuning coil 46 is supported from the bracket 152 to permit ready adjustment of the oscillator tuning frequency.

The range adapter unit 18 is removably mounted on the connecting studs 164 by means of the screws 165, the studs 164 being secured to a board 166 of insulating material which is in turn supported on the bracket 150. The studs 164 are connected in circuit as shown in FIG. 1 so that when the screws 165 are tightened to secure the board 18 to the studs 164 electrical connection is also made to the desired circuit elements in the manner shown in FIG. 1. The shaft 170 of the zero adjustment potentiometer 50 and the shaft 171 of the span adjustment potentiometer 74 on the range adapter unit 18 are provided with screwdriver adjustments to permit variation of the span and zero settings of the range adapter unit 18.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. A transmitting potentiometer, comprising an electromechanical force balance unit including a pivotally mounted beam carrying an input coil which is positioned in a magnetic field, means including oscillator means for developing a direct current output proportional to the position of said beam, a resistance bulb potentiometric bridge circuit adapted to be connected to a resistance bulb primary measuring element, means connecting said input coil to said bridge circuit to detect unbalance thereof, means connecting at least a portion of said oscillator output current to said bridge circuit in the correct polarity to rebalance the same, a source of unregulated alternating current, rectifier means for deriving from said alternating current a unidirectional voltage, means including a gaseous discharge voltage regulator tube for developing a regulated reference voltage from said unidirectional voltage, and means for supplying said reference voltage to said bridge circuit to energize the same.

2. A transmitting potentiometer, comprising an electromechanical force balance unit including a pivotally mounted beam carrying an input coil which is positioned in a magnetic field, means including oscillator means for developing a direct current output proportional to the position of said beam, a thermocouple potentiometric bridge circuit adapted to be connected to a thermocouple primary measuring element, means connecting said input coil to said bridge circuit to detect unbalance thereof, means connecting at least a portion of said oscillator output current to said bridge circuit in the correct polarity to rebalance the same, a source of unregulated alternating current, rectifier means for deriving from said alternating current a unidirectional voltage, means including a reverse connected silicon junction diode for developing a regulated reference voltage from said unidirectional voltage, and means for supplying said reference voltage to said bridge circuit to energize the same.

3. A transmitting potentiometer, comprising an electromechanical force balance unit including a pivotally mounted beam carrying an input coil which is positioned in a magnetic field, means including oscillator means for developing a direct current output proportional to the position of said beam, a thermocouple potentiometric bridge circuit adapted to be connected to a thermocouple primary measuring element, means connecting said input coil to said bridge circuit to detect unbalance thereof, means connecting at least a portion of said oscillator output current to said bridge circuit in the correct polarity to rebalance the same, a source of unregulated alternating current, rectifier means for deriving from said alternating current a unidirectional voltage, a tube socket having a plurality of tube pin receptacles, a plug-in voltage regulator unit adapted to be received in said receptacles and including a reverse connected silicon junction diode for developing a regulated reference voltage from said unidirectional voltage, and means for supplying said reference voltage to said bridge circuit to energize the same.

4. A transmitting potentiometer, comprising an electromechanical force balance unit including a pivotally mounted beam carrying an input coil which is positioned in a magnetic field, means including oscillator means for developing a direct current output proportional to the position of said beam, a strain gauge potentiometric bridge circuit adapted to be connected to a strain gauge primary measuring element, means connecting said input coil to said bridge circuit to detect unbalance thereof, means connecting at least a portion of said oscillator output current to said bridge circuit in the correct polarity to rebalance the same, a source of alternating current, means including a pair of germanium rectifiers for developing a unidirectional reference voltage from said alternating current, and means for supplying said reference voltage to said bridge circuit to energize the same.

5. A transmitting potentiometer, comprising an electromechanical force balance unit including a pivotally mounted beam carrying an input coil which is positioned in a magnetic field, means including oscillator means for developing a direct current output proportional to the position of said beam, a strain gauge potentiometric bridge circuit adapted to be connected to a strain gauge primary measuring element, means connecting said input coil to said bridge circuit to detect unbalance thereof, means connecting at least a portion of said oscillator output current to said bridge circuit in the correct polarity to rebalance the same, a tube socket having a plurality of tube pin receptacles, a plug-in unit adapted to be received in said receptacles and including a pair of germanium rectifiers for developing a unidirectional reference voltage from said alternating current, and means for supplying said reference voltage to said bridge circuit to energize the same.

References Cited in the file of this patent

UNITED STATES PATENTS

| | | |
|---|---|---|
| Re. 23,850 | Roper | July 13, 1954 |
| 2,307,636 | Kelly | Jan. 5, 1943 |
| 2,372,600 | Newman | Mar. 27, 1945 |
| 2,485,902 | Melton | Oct. 25, 1949 |
| 2,730,618 | Michaels | Jan. 10, 1956 |
| 2,747,098 | Tarca et al. | May 22, 1956 |